United States Patent [19]
Fennel et al.

[11] Patent Number: 5,270,933
[45] Date of Patent: Dec. 14, 1993

[54] CIRCUIT CONFIGURATION FOR A BRAKE SYSTEM WITH ANTI-LOCK CONTROL AND/OR TRACTION SLIP CONTROL

[76] Inventors: Helmut Fennel, Schubertstrasse 9, 6232 Bad Soden; Hans Wupper, Eichaeckerstrasse 10A, 6382 Friedrichsdorf/Ts., both of Fed. Rep. of Germany; Ivica Batistic, Rossdorfer Strasse 18, 6000 Frankfurt/Main 60, Yugoslavia; Hans-Joachim Buettner, Lueckweg 13, 6331 Hohenahr-Erdar, Fed. Rep. of Germany

[21] Appl. No.: 752,615
[22] PCT Filed: Dec. 23, 1989
[86] PCT No.: PCT/EP89/01607
§ 371 Date: Aug. 14, 1991
§ 102(e) Date: Aug. 14, 1991
[87] PCT Pub. No.: WO90/09301
PCT Pub. Date: Aug. 23, 1990

[30] Foreign Application Priority Data

Feb. 18, 1989 [DE] Fed. Rep. of Germany ....... 3905045

[51] Int. Cl.⁵ .................. B60T 8/64; B60T 8/84
[52] U.S. Cl. ............. 364/426.02; 364/426.01; 180/197; 303/103; 303/102; 303/100; 303/95
[58] Field of Search ............ 364/426.03, 426.04, 364/426.01, 426.02; 303/95, 100, 102, 103, 106; 180/197

[56] References Cited

U.S. PATENT DOCUMENTS

| | | | |
|---|---|---|---|
| 4,276,481 | 6/1981 | Parker | 290/43 |
| 4,765,342 | 8/1988 | Urman et al. | 128/725 |
| 4,844,557 | 7/1989 | Giers | 364/426.02 |

FOREIGN PATENT DOCUMENTS

| | | |
|---|---|---|
| 0274397 | 1/1988 | European Pat. Off. . |
| 0293561 | 12/1988 | European Pat. Off. . |
| 8904782 | 6/1989 | Fed. Rep. of Germany . |
| 2509242 | 7/1982 | France . |

*Primary Examiner*—Vincent N. Trans
*Attorney, Agent, or Firm*—Robert P. Seitter; J. Gordon Lewis

[57] ABSTRACT

A circuit configuration for a brake system with anti-lock control and traction slip control comprising, wheel sensors for generating electric signals representing the wheel rotational behavior and circuits for the cornering identification is provided such that lateral reference speeds (13, 14) are formed by virtue of selection circuits (8, 9) which select leading wheel speed according to specific criteria, and by virtue of a filter means (10, 11) whose time constants (12) are variable. A difference signal (DVS) is formed of the lateral references speeds (SRG$_L$, SRG$_R$), the magnitude of which is variable by inverse feedback. This difference signal (DVS) serves to actuate an adaptation circuit (18) as a function of the vehicle reference speed (V$_{REF}$). The adaptation circuit influences on the control thresholds of the anti-lock control and traction slip control to adapt the control to the particularities of cornering.

13 Claims, 1 Drawing Sheet

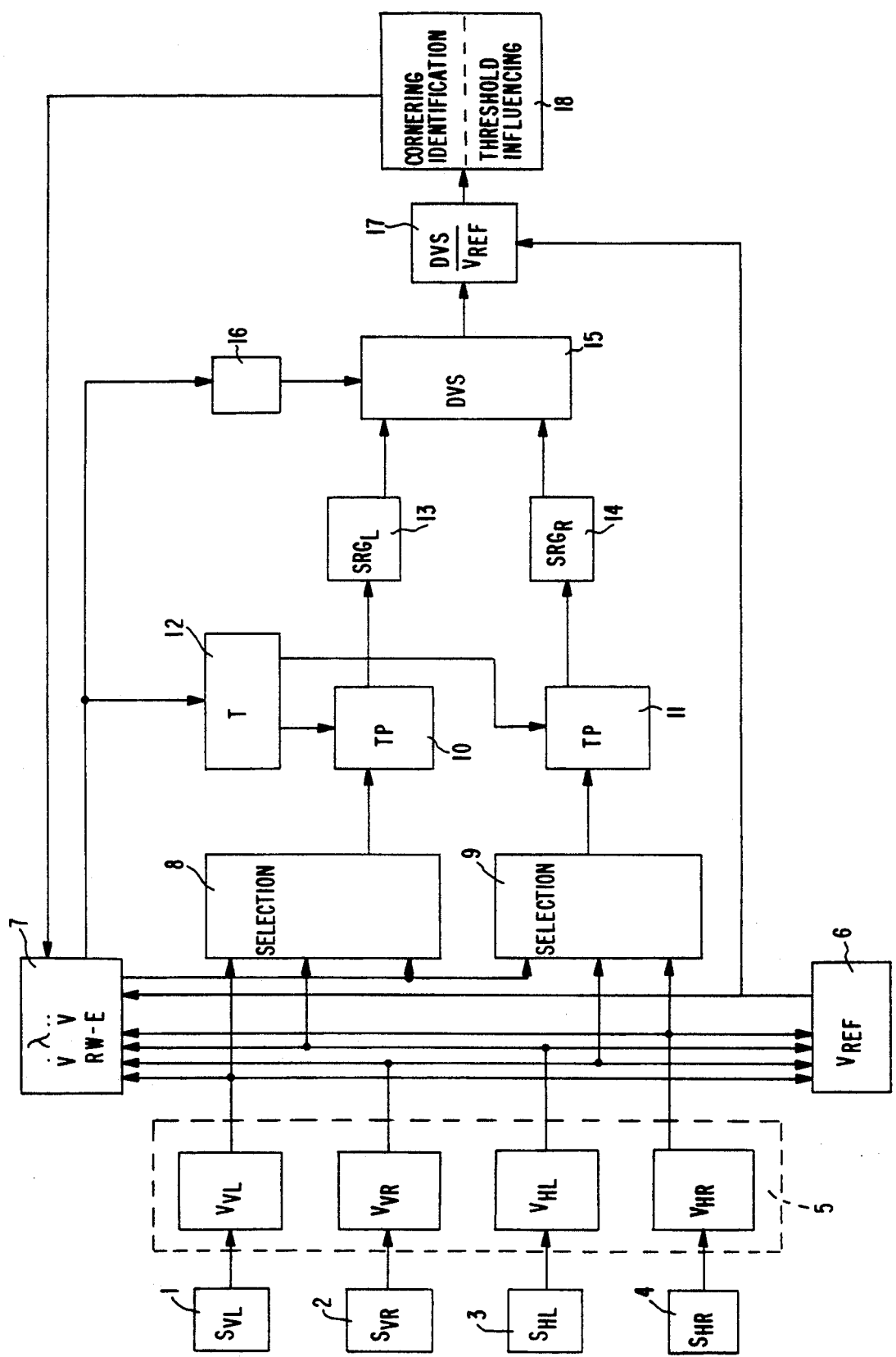

CIRCUIT CONFIGURATION FOR A BRAKE SYSTEM WITH ANTI-LOCK CONTROL AND/OR TRACTION SLIP CONTROL

BACKGROUND OF THE INVENTION

The present invention relates to a circuit configuration for a brake system with anti-lock control and/or traction slip control. The brake system includes wheel sensors for generating electric signals representing the wheel rotational behavior, and the circuit configuration includes circuits for forming a vehicle reference speed, for selecting sensor signals, for identifying cornering and for generating braking pressure control signals. The rotational behavior of the wheels of each vehicle side is determined separately in a first step, and the measured values of each vehicle side are then compared in a second step.

Similar circuit configurations for anti-lock brake systems with circuits for cornering identification are known. According to German patent application 34 13 738, the wheel rotational behavior is measured by wheel sensors, the slip is determined by comparing the measured values with a vehicle reference speed, and the slip sum is formed individually for each vehicle side. Finally, the difference of the slip sums of both vehicle sides is ascertained, and the selection criteria (select-low, etc.) dictating the influence of the individual wheels on the control is varied when the difference of the slip sums exceeds a limit value. In this manner, the control is adapted to the different vehicle behavior while driving straight forward, or while cornering.

German patent application 21 19 590 teaches an anti-lock control system which measures the transverse acceleration of the vehicle, such as by virtue of a mercury switch, for cornering identification. In this system, the wheels of an axle are controlled according to the select-high principle in the normal case, and after the cornering identification there is a change-over to select-low. Furthermore, systems are known which, for cornering identification, employ a steering-angle signalling device in the form of a switch which is operated mechanically upon steering movement. The output signal of this device influences the anti-lock control system by modifying it in view of the changed vehicle behavior during cornering.

It is an object of the present invention to provide a circuit configuration which, from only the information supplied by the existing wheel sensors, derives a cornering-identification signal and which provides a precisely responsive adaptation of the control to different driving and road situations.

SUMMARY OF THE INVENTION

This object is achieved with a circuit configuration by which in a first step, a lateral reference speed is formed for each vehicle side according to predetermined criteria. Then, a difference signal is generated from both lateral reference speeds which, after being combined with the vehicle reference speed, is evaluated for cornering identification and/or for the adaptation of the control to the vehicle behavior during cornering. Thus, the variations of wheel load, the steering angle and the like are considered. Accordingly, no additional sensors are required. The required information relating to cornering is derived from the different rotational behavior of the wheels on the inside of a curve and the wheels on the outside of the curve. A cornering-identification signal is obtained which adjusts the control in a delicately responsive manner to different situations.

According to a favorable embodiment of the present invention, selection circuits are provided which, for the purpose of forming the lateral reference speed according to predetermined selection and evaluation criteria, respectively derive a leading wheel speed. The leading wheel speed is supplied to a filter means (e.g., a low-pass filter) with a variable filter time constant that is determined by the instantaneous friction value or coefficient of friction, respectively, or a corresponding measured variable, with the filter time constant increasing continuously or in steps with a decreasing coefficient of friction. Expediently, the filter time constant which applies for a high coefficient of friction is roughly on the order of a 1:2:4 ratio in relation to the time constant for a medium friction value and in relation to the time constant for a low friction value. In other cases, the filter time constant for a low coefficient of friction increases three to ten times by the amount for a high coefficient of friction.

Another embodiment of the present invention provides that the difference signal formed of both lateral reference speeds is modified by a connectible feedback circuit. The feedback circuit is activated in the presence of "normal", typical wheel rotational behavior during an anti-lock braking operation, reducing the difference signal. The feedback circuit is deactivated or influences the difference signal only slightly when indifferent, atypical wheel rotational behavior occurs. Therefore, in the latter case, in the presence of atypical wheel rotational behavior, the influence on the control thresholds and thus the reduction of control sensitivity during cornering is substantial.

For the adaptation of the control, a corrective signal is derived by dividing the difference signal by the vehicle reference speed. This correction signal is supplied to an adaptation circuit which increases the control thresholds continuously or in steps proportionally to or as a function of the magnitude of the corrective signal and/or which reduces the sensitivity of the control. To this end, the slip thresholds of the control and/or the deceleration thresholds for yawing torque limitation or the like are variable in response to the corrective signal.

When selecting the leading wheel or wheel in lead, in the absence of control, the slower wheel is principally chosen, while in the presence of a control action, principally the faster vehicle wheel is taken as wheel in lead for the formation of the respective lateral reference speed. However, in one embodiment, the dominant influence of the lateral reference speed will pass from the faster to the slower wheel during a control action, as soon as the speed of the leading wheel rises in excess of the vehicle reference speed. This applies in the event of overspeeding, when any one of the wheels, for example a driven wheel, due to the action of the drive motor attains a velocity which exceeds the velocity of the vehicle.

Moreover, in another embodiment of the present invention, the filter means which is furnished with the speed signal of the wheel in lead reacts to the decrease of the leading wheel speed, while it does not influence signals of rising speed. Thus, filtering is effected only in one direction.

BRIEF DESCRIPTION OF THE DRAWING

Further features, advantages and applications of the present invention will be gathered from the following detailed description of an embodiment with reference to the accompanying drawing in which the single figure, in a block diagram, depicts the design and the operation of a circuit configuration according to the present invention.

DETAILED DESCRIPTION

The signals to be processed are obtained by individual wheel sensors 1 to 4, the output signals of which represent the rotational behavior of the individual wheels. The indicia VL and VR refer to the left and the right front wheel, while the indicia HL and HR refer to the left and the right rear wheel. In a circuit 5, the sensor signals are processed, and the speed signals $v_{VL}$, $v_{VR}$, $v_{HL}$ and $v_{HR}$ are obtained. By logic combining according to predetermined criteria, the vehicle reference speed $v_{REF}$ is formed from the individual speed signals in a circuit block 6. The deceleration signals and acceleration signals v, the jerk v and, with the aid of the vehicle reference speed $v_{REF}$, the instantaneous slip of each wheel are defined on the basis of the speed signals individually for each wheel in an evaluation circuit 7. Evaluation circuit 7 also accommodates a coefficient-of-friction identification (RW-E), which determines the prevailing coefficient of friction from, for example, the duration of the pressure reduction or from the deceleration of a stably running wheel at the point of time when a locking tendency is encountered.

The speed signals $v_{VR}$, $v_{HR}$, $v_{VL}$ and $v_{HL}$ of the two wheels of a vehicle side are delivered respectively to selection circuits 8, 9 which select the leading wheel speed for the respective vehicle side according to predetermined criteria. The information regarding the commencement of the control action which is necessary for determining the wheel in-lead is transmitted by way of a signal line extending from the evaluation circuit 7 to the circuits 8 and 9.

To ascertain the lateral reference speed, the wheel speed chosen in the circuit 8 and/or 9 is conducted by way of a filter means 10 and/or 11, which is designed as a low-pass filter of first order in the instant embodiment. The filter time constant (T) of the two filter means 10, 11 is variable and, as is symbolized by circuit 12, is a function of the actual coefficient of friction which is determined by the evaluation circuit 7. When a high coefficient of friction is signalled by the circuit 7, i.e., approximately at a coefficient of friction greater than 0.6, the time constant is just sufficient so that the relatively fast variations or fluctuations of the wheel speed which usually exist and to which the control shall not react are eliminated. With the coefficient of friction decreasing, the filter time constant is increased by means of the circuit 12, since control cycles of longer duration occur. It is expedient to increase the filter time constant with a low coefficient of friction to three up to ten times the amount in comparison to the time constant with a high coefficient of friction. In one embodiment, the ratio of the filter time constant T at a high coefficient of friction to the time constant at a medium coefficient of friction and to the time constant at a low coefficient of friction ($\mu 0.1$) is on the order of 1 to 2 to 4. In one embodiment of this invention, the filter means 10, 11 were devised such that the filter time constant was effective with a decreasing wheel speed signal, whereas increasing speed signals were not influenced by the filter means. In the event that the leading wheel speed increases in excess of the previous output quantity of the filter means 10, 11, the higher speed immediately becomes the lateral reference speed.

The output signals of the filter means 10, 11 represent the lateral reference speeds SRG - left ($SRG_L$) and SRG - right ($SRG_R$) respectively. This is symbolized by the stages 13 and 14. Subsequently, the difference DVS of the speed signals is formed in a stage 15. The output signal of this stage additionally depends on the influence of a connectable inverse feedback circuit 16 which is connected to the evaluation circuit 7. In the case of "normal" wheel rotational behavior typical of slip-controlled braking, the inverse feedback is relatively great, and hence the influence of the difference signal on the control is minimized. On the other hand, in the case of indifferent, atypical wheel rotational behavior, which can be caused for example by disturbances, widely varying coefficients of friction and other critical situations, the inverse feedback becomes relatively little and, consequently, the influence of the difference signal DVS caused by cornering becomes comparatively great. The degree of inverse feedback can vary in several steps or continuously so that the influence on the control thresholds is dependent on the extent of the disturbance or the discrepancy from the "normal" behavior.

The difference signal DVS, namely the output signal of the stage 15, is divided in a divider 17 by the vehicle reference speed $v_{REF}$ before it is delivered to an adaptation circuit 18 in which the influence on the control is performed. Thus, the influence of the difference signal on the control is dependent on the vehicle speed and/or the vehicle reference speed. The output signal of the adaptation circuit 18 is led to the evaluation circuit 7. In another embodiment of the present invention, control thresholds are raised or lowered by way of this path as a function of the input signal of the circuit 18 and thus as a function of the difference signal DVS and the degree of the inverse feedback. For instance, the sensitivity of the control can be varied by shifting the slip thresholds. By shifting the deceleration thresholds and/or acceleration thresholds which determine the point of time of pressure reduction and pressure build-up during a control operation, the sensitivity of the control is also influenced. A timely de-activation of a yawing torque limitation or reduction of the corresponding switch threshold may be important, for example, during cornering in order to safeguard that the vehicle wheel or wheels which have relatively much road contact are furnished with sufficient braking pressure. In principle, the adaptation circuit 18 will influence each control variable which can adapt the control to the special conditions of cornering in the desired manner.

The mode of function of the inventive arrangement can be taken from the preceding description of the individual circuits and their wiring. As long as the vehicle drives straight ahead or deviates only slightly from the straight line, the lateral reference speeds are almost equal. In this case, adaptation circuit 18 does not influence the control thresholds of the anti-lock control system or traction slip control system. During cornering, the different distances covered by the wheels on the inside of a curve and wheels on the outside of a curve result in divergent lateral reference speeds $SRG_L$, $SRG_R$ and thus in a difference signal at the output of stage 15. However, in the presence of typical, "normal"

control actions, the inverse feedback by circuit 16 becomes substantial, and hence the output signal of stage 15 becomes relatively small. The influence on the control thresholds by the adaptation circuit 18 becomes negligible in this case. The vehicle reference speed is still of significance in this regard because the output signal of the stage 15 is divided by the vehicle reference speed in the circuit 17, while taking into consideration a constant factor under certain circumstances.

The low-pass filters 10, 11 prevent relatively quick speed variations from being delivered. These variations are caused by disturbances, vibrations, road bumps and the like. In the presence of a high coefficient of friction, the time constant T (12) is relatively small, while it is substantial with a low coefficient of friction because the individual control actions, for example, pressure reduction, will last relatively long in the case of a low coefficient of friction.

The connectable inverse feedback provided by circuit 16 has the effect that when an atypical, critical control behavior is encountered during cornering, the output signals of the stages 15 and 17 become great. As a consequence, the control thresholds are raised and thus the control becomes less sensitive. For example, the wheel slip can exceed that which prevails during a normal control behavior prior to the control commencing. On the other hand, an enhanced control sensitivity can be chosen for the normal case and for driving straight forward because the cornering identification and the adaptation of the switch thresholds to the behavior of the vehicle during cornering is ensured in the circuit configuration in accordance with the present invention.

As indicated hereinabove, the cornering identification also can be employed for varying the reaction of the control on yawing torques. This is because measures for suppressing yawing torques are very useful when driving straight forward, while they may be disadvantageous during cornering. Therefore, it is an advantage to disable this yawinq-torque attenuation by the obtained cornering identification signal and/or to lower the thresholds for switching off the yawing-torque limitation. As will be appreciated by those skilled in the art, further control variations are possible which result in improved vehicle behavior during cornering and which therefore are provided by the output signal of the circuit in accordance with the principles of the present invention.

What is claimed is:

1. A circuit configuration for a brake system with at least one anti-lock control and traction slip control, responsive to braking pressure control signals, for an automotive vehicle having wheels with each wheel having a rotational behavior and a speed, said circuit configuration comprising:

wheel sensors for generating sensor signals representative of the rotational behavior of said wheels;
first circuit means, responsive to said sensor signals for generating:
(a) speed signals representative of the speed of the wheels, and
(b) vehicle reference speed signals representative of the vehicle reference speed;
second circuit means, responsive to:
(a) said speed signals, and
(b) said vehicle reference speed signals for generating:
(a) first lateral reference speed signals representative of a first lateral reference speed of the wheels of a first vehicle side, and
(b) second lateral reference speed signals representative of a second lateral reference speed of the wheels of a second vehicle side;
third circuit means, responsive to said first lateral reference speed signals and said second lateral reference speed signals, for generating difference signals representative of the difference between said first lateral reference speed signals and said second lateral reference speed signals; and
fourth circuit means, responsive to said difference signals, for selectively controlling application of said braking pressure control signals.

2. A circuit configuration in accordance with claim 1, wherein said second circuit means includes:
first selection circuit means, responsive to the wheel speeds of the first vehicle side, for selecting a first leading wheel speed for the first vehicle side; and
second selection circuit means, responsive to the wheel speeds of the second vehicle side, for selecting a second leading wheel speed for the second vehicle side.

3. A circuit configuration in accordance with claim 2, wherein said second circuit means includes:
first filter means, responsive to said first leading wheel speed and having a variable time constant dependent on the prevailing coefficient of friction, for generating said first lateral reference speed signals; and
second filter means, responsive to said second leading wheel speed and having a variable time constant dependent on the prevailing coefficient of friction, for generating said second lateral reference speed signals.

4. A circuit configuration as claimed in claim 3, including a circuit which increases the time constant in the presence of a low coefficient of friction by three to ten times the amount relative to the time constant at a high coefficient of friction.

5. A circuit configuration as claimed in claim 3, wherein the time constant which applies for a high coefficient of friction is roughly 1:2:4 in relation to the time constant applying to a medium coefficient of friction and in relation to the time constant applying to a low coefficient of friction.

6. A circuit configuration as claimed in claim 5, wherein the difference signal (DVS) formed of both lateral reference speeds ($SRG_L$, $SRG_R$) is modified by a connectable inverse feedback circuit (16) which is activated in the presence of normal wheel rotational behavior during an anti-lock braking operation and thereby reduces the difference signal and which is de-activated or influences the difference signal (DVS) only slightly when indifferent, atypical wheel rotational behavior occurs.

7. A circuit configuration as claimed in claim 5, wherein for the adaptation of the control, a corrective signal is derived by division of the difference signal (DVS) by the vehicle reference speed ($V_{REF}$) and is supplied to an adaptation circuit which raises at least one control threshold continuously proportionally to the magnitude of the corrective signal and reduces the sensitivity of the control.

8. A circuit configuration as claimed in claim 7, wherein the slip thresholds of the control and the deceleration thresholds and acceleration thresholds and switch-off thresholds for yawing torque limitation are variable in response to the corrective signal.

9. A circuit configuration as claimed in claim 2, wherein in the absence of a control action, the slower wheel speed is selected as the leading wheel speed, while in the presence of a control action the faster wheel speed is selected as the leading wheel speed for the formation of the lateral reference speed.

10. A circuit configuration as claimed in claim 9, wherein during a control action, the governing of the lateral reference speed ($SRG_L$, $SRG_R$) reverts to the slower wheel when the speed of the leading wheel rises in excess of the vehicle reference speed ($V_{REF}$).

11. A circuit configuration as claimed in claim 10, wherein the filter means (10, 11) reacts to the decrease of the leading wheel speed, and does not take influence on rising speed signals.

12. A circuit configuration for a brake system with at least one anti-lock control and traction slip control, responsive to braking pressure control signals, for an automotive vehicle having wheels each wheel having a rotational behavior and a speed, said circuit configuration comprising:

wheel sensors for generating sensor signals representative of the rotational behavior said wheels;

first circuit means, responsive to said sensor signals, for processing said sensor signals and generating speed signals representative of the speed of the wheels;

second circuit means, responsive to said speed signals, for generating vehicle reference speed signals representative of the vehicle reference speed;

third circuit means, responsive to said speed signals and said vehicle reference speed signals, for generating:
  (a) wheel slip signals representative of individual wheel slip,
  (b) deceleration and acceleration signals representative of the first derivative of the wheel speeds,
  (c) jerk signals representative of the second derivative of the wheel speeds, and
  (d) coefficient of friction signals representative of the prevailing coefficient of friction;

a first selection circuit, responsive to said third circuit means and to the speed signals of the wheels of a first vehicle side, for selecting a first leading wheel speed signal for the first vehicle side;

a second selection circuit, responsive to said third circuit means and to the speed signals of the wheels of a second vehicle side, for selecting a second leading wheel speed signal for the second vehicle side;

first filter means, responsive to said first leading wheel speed signal and having a variable time constant dependent on the prevailing coefficient of friction, for generating a first lateral reference speed signal representative of a first lateral reference speed and for:
  (a) at high coefficients of friction, eliminating relatively fast fluctuations of the wheel speed by setting the variable time constant at a relatively low value, and
  (b) at low coefficients of friction, accommodating relatively long-duration control cycles by setting the variable time constant at a relatively high value, second filter means, responsive to said second leading wheel speed signal and having a variable time constant dependent on the prevailing coefficient of friction, for generating a second lateral reference speed signal representative of a second lateral reference speed and for:
  (a) at high coefficients of friction, eliminating relatively fast fluctuations of the wheel speed by setting the variable time constant at a relatively low value, and
  (b) at low coefficients of friction, accommodating relatively long-duration control cycles by setting the variable time constant at a relatively high value, fourth circuit means, responsive to said first lateral reference speed signal and said second lateral reference speed signal, for generating a difference signal representative of the difference between said first lateral reference speed and said second lateral reference speed;

fifth circuit means, responsive to said difference signal and said vehicle reference speed signal, for dividing said difference by said vehicle reference speed to generate a corrective signal; and an adaptation circuit, responsive to said corrective signal, for selectively controlling application of said braking pressure control signals.

13. A circuit configuration in accordance with claim 1 wherein said braking pressure control signals are applied whenever they exceed a threshold, and said fourth circuit means modifies said threshold.

* * * * *